(12) United States Patent
Jonasson et al.

(10) Patent No.: US 6,616,018 B2
(45) Date of Patent: Sep. 9, 2003

(54) FLUID DISPENSING APPARATUS

(75) Inventors: Patrik Jonasson, Askim (SE); Lennart Sjöstedt, Åryd (SE); Lennart Sven Thålin, Mölndal (SE); Mats Pegelow, Kullavik (SE); Göran Nybom, Sandby (SE); Ove Andersson, deceased, late of Västra Frölunda (SE), by Elisabet Leijon, David Andersson, legal representatives

(73) Assignee: Markpoint AB, Sverige (SE)

( * ) Notice: Subject to any disclaimer, the term of this patent is extended or adjusted under 35 U.S.C. 154(b) by 0 days.

(21) Appl. No.: 09/883,657

(22) Filed: Jun. 18, 2001

(65) Prior Publication Data

US 2002/0191053 A1 Dec. 19, 2002

(51) Int. Cl.⁷ .............................. B67D 3/00; B67D 5/06
(52) U.S. Cl. ................... 222/504; 222/517; 251/129.06
(58) Field of Search .................. 222/504, 505, 222/508, 515, 517; 251/11, 129.06

(56) References Cited

U.S. PATENT DOCUMENTS

| | | | |
|---|---|---|---|
| 4,072,959 A | 2/1978 | Elmqvist | 347/68 |
| 4,340,083 A | 7/1982 | Cummins | 137/499 |
| 4,629,926 A | 12/1986 | Siegal | 310/331 |
| 4,875,058 A | 10/1989 | Vonasek | 347/54 |
| 6,164,621 A * | 12/2000 | Bouchard et al. | 251/129.06 |
| 6,173,744 B1 * | 1/2001 | Frisch et al. | 137/625.65 |
| 6,257,445 B1 * | 7/2001 | Means et al. | 222/1 |
| 6,499,509 B2 * | 12/2002 | Berger et al. | 137/625.65 |

* cited by examiner

*Primary Examiner*—Joseph A. Kaufman
(74) *Attorney, Agent, or Firm*—Samuels, Gauthier & Stevens, LLP

(57) ABSTRACT

Fluid dispensing apparatus (10) for selectively dispensing desired quantities of a fluid under pressure. The apparatus includes a base plate (14) having a dispensing passage (16) extending about a first axis (18); a valve arrangement (20) associated with the dispensing passage (16), and a piezo-electric transducer (22) acting on the valve arrangement (20) to effect displacement of the valve arrangement between a first position in which the dispensing passage (16) is closed and a second position in which the dispensing passage is connected to a source of the fluid under pressure. The valve arrangement (20) includes a slide valve (24), with the slide valve and the piezoelectric transducer (22) being arranged such that during at least initial displacement of the valve arrangement from the second position towards the first position, the slide valve (24) is displaced in a direction transverse to the first axis (18).

16 Claims, 7 Drawing Sheets

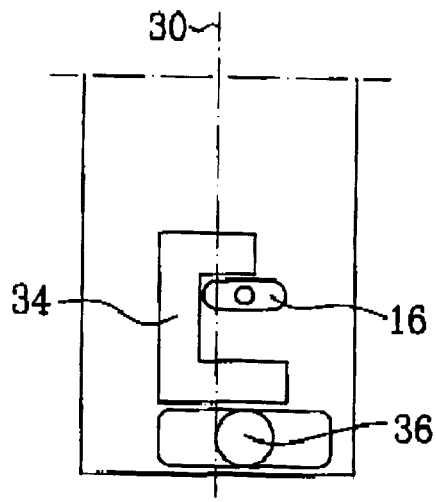
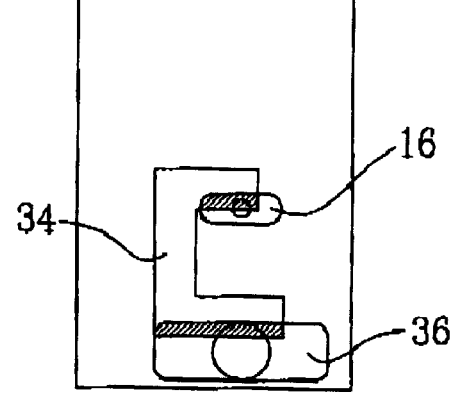
FIG.6c　　　　　FIG.6d
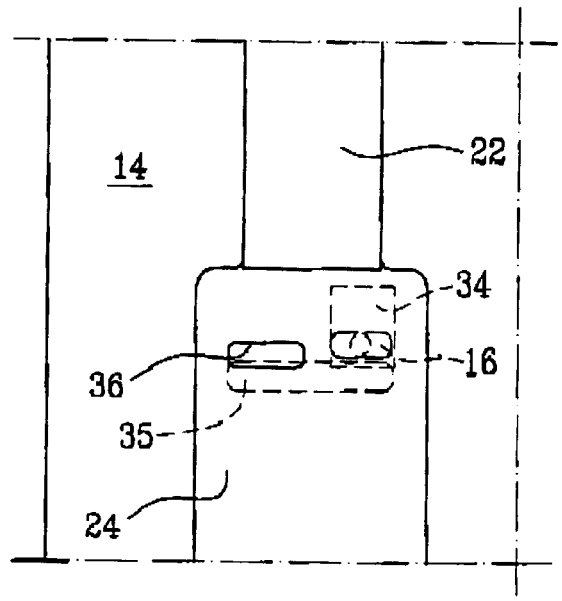
FIG.7

FLUID DISPENSING APPARATUS

TECHNICAL FIELD

The present invention relates to a fluid dispensing apparatus, primarily though not exclusively for use in ink jet printers.

BACKGROUND OF THE INVENTION

The use of piezoelectric transducers in fluid dispensing apparatus such as ink jet printers is becoming increasingly widespread. A recorder operating with drops of liquid is disclosed in U.S. Pat. No. 4,072,959 in which rod-shaped piezoelectric transducers are located in front of inlet openings to nozzles. The piezoelectric transducers are secured at one end in a housing which contains the ink to be expelled, while the free ends of the transducers cover the inlet openings. When applying an electrical potential across a transducer, the transducer bends away from the inlet opening. If the applied potential is briefly interrupted, the transducer snaps back to the unbent position and thereby squeezes a drop of ink through the nozzle. It is to be noted that the recorder disclosed in this document cannot be used for dispensing fluid under pressure since the piezoelectric transducers cannot seal the inlet openings to the nozzles.

A fluid control device for controlling the flow of fluid under pressure is disclosed in U.S. Pat. No. 4,629,926. In said device, a piezoelectric spring-like bender is operatively associated with an impacting member. The impacting member is capable of deforming a membrane to control flow past a valve seat upon change in the electrical condition of the bender. Each bender and impacting member is isolated from the fluid by the membrane, with the membrane thus acting as a seal against the valve seat. In order to ensure adequate sealing, the bender must be capable of counteracting the pressure in the fluid acting on the membrane when the fluid control device is in its closed position.

A flow control valve 44 ng a piezoelectric spring-like bender which acts directly on a valve seat is described in U.S. Pat. No. 4,340,083. The valve in said document is designed to provide a substantially constant flow independent of changes in the pressure differential thereacross and/or to exert a minimum closing force against the seat so as to provide a substantially fluid-tight seal therewith in the absence of a command signal applied to the bender. In order to open the flow control valve, the bender must overcome the force acting on the bender as a result of the fluid pressure.

Particularly in ink jet printer heads, a need exists for high frequency, high resolution, long printing distance, robust, reliable and inexpensive devices. There is also a wish to have greater freedom when formulating inks. It is therefore an object of the present invention to provide such a device.

SUMMARY OF THE INVENTION

The above object is achieved by fluid dispensing apparatus for selectively dispensing desired quantities of a fluid under pressure, the apparatus comprising a base plate having a dispensing passage extending about a first axis; a valve arrangement associated with the dispensing passage, and a piezoelectric transducer acting on the valve arrangement to effect displacement of the valve arrangement between a first position in which the dispensing passage is closed and a second position in which the dispensing passage is connected to a source of said fluid under pressure. In accordance with the present invention, the valve arrangement comprises a slide valve, with the slide valve and piezoelectric transducer being arranged such that during at least initial displacement of the valve arrangement from the second position towards the first position, the slide valve is displaced in a direction transverse to the first axis.

By using a slide valve, the dispensing passage can be opened and closed without resorting to a lifting arrangement. This implies that the two functions previously effected by the transducer, namely sealing and displacing the valve arrangement, are separated, thereby simplifying the arrangement and allowing i.a. lower energy consumption.

In one embodiment of the invention, the slide valve comprises a valve plate arranged for translational displacement, either by an axial displacement of the piezoelectric transducer or by a transverse displacement thereof.

In a further embodiment, the slide valve comprises a valve plate arranged for rotational displacement, again either by an axial displacement of the piezoelectric transducer or by a transverse displacement thereof.

BRIEF DESCRIPTION OF THE DRAWINGS

The invention will be described in the following in greater detail by way of example only and with reference to the attached drawings, in which:

FIGS. 6a–6d are simplified plan views showing one possible valve arrangement of the embodiment of FIG. 5;

FIG. 7 is a simplified plan view of a part of another valve arrangement for use in the embodiment of FIG. 5;

DETAILED DESCRIPTION OF PREFERRED EMBODIMENTS

Figure 1:
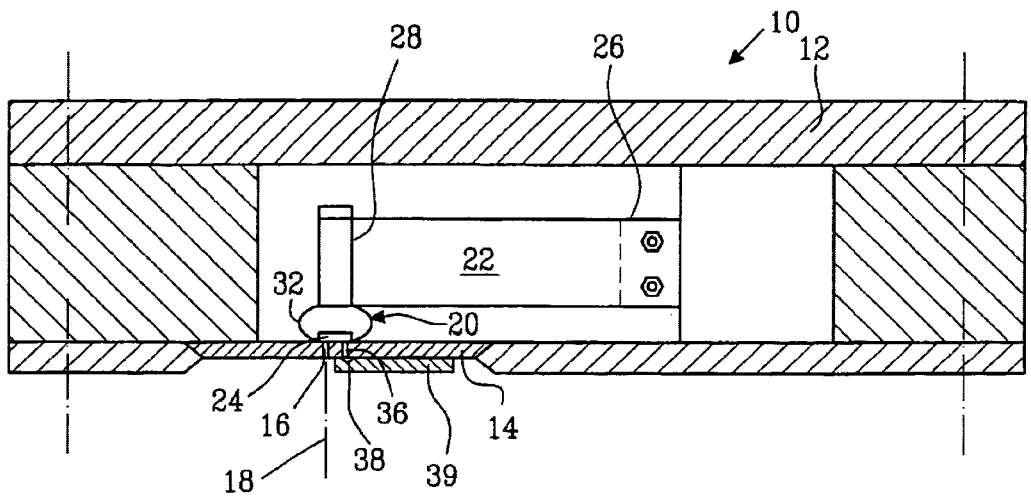
FIG. 1 is a schematic sectional view though a first embodiment of fluid dispensing apparatus according to the present invention.

In the drawings, reference numeral 10 generally denotes fluid dispensing apparatus according to the present invention. The apparatus 10 comprises a housing 12 having a base plate 14. The base plate 14 is provided with at least one dispensing passage 16 extending about a first axis 18. The term base plate is intended to mean any wall or plate of fluid dispensing apparatus in which one or more dispensing passages 16 are located. Thus, the base plate need not necessarily be a major surface of the apparatus. Associated with each dispensing passage 16, i.e. substantially immediately adjacent the passage in the interior of the housing 12, there is arranged a valve arrangement, generally denoted by reference numeral 20. In each embodiment, a piezoelectric transducer 22 acts on the valve arrangement 20 to effect displacement of the valve arrangement between a first position in which the dispensing passage 16 is closed and a second position in which the dispensing passage is connected to a source of fluid under pressure.

In accordance with the invention, and as will be explained in greater detail with respect to each illustrated embodiment, the valve arrangement 20 comprises a slide valve 24, the slide valve 24 and the piezoelectric transducer 22 being arranged such that during at least initial displacement of the valve arrangement 20 from its second position towards its first position, the slide valve 24 is displaced in a direction transverse to the first axis 18.

Figure 2A:
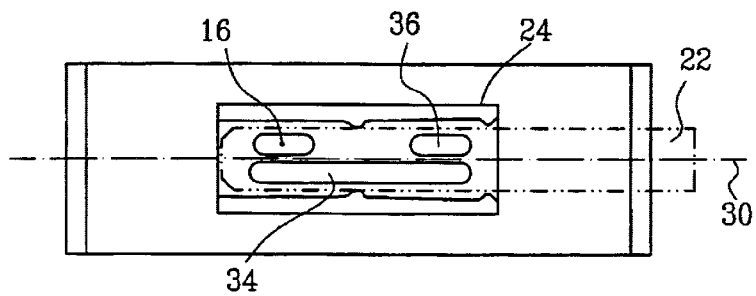
FIG. 2a is a partial plan view of the embodiment of FIG. 1, though on a larger scale, showing the valve arrangement in a closed position.

Each piezoelectric transducer 22 has a longitudinal extension from a first end 26 to a second end 28 along a second axis 30 (see e.g. FIG. 2a). As is well known in the art, application of an electrical potential across a piezoelectric transducer causes the transducer to change shape. This change of shape can for example be a change in the length of the transducer, i.e. along the second axis, or through multilayer techniques converting the change in length to a bending mode, i.e. transverse to the second axis (bender).

The various embodiments of the present invention can be divided up into different groups depending on different ways in which the valve arrangement 20 operates. For example, in one group of embodiments, as illustrated in FIGS. 1 to 4, 8 and 9, the displacement of the slide valve is effected by a displacement of a portion of the piezoelectric transducer 22 in a direction transverse to the second axis 30. In another group of embodiments, and as illustrated in FIGS. 5 to 7, and 10 to 12, displacement of the slide valve is effected by a displacement of a portion of the piezoelectric transducer 22 in a direction along the second axis 30.

Another distinction between the various embodiments is the manner of displacement of the valve arrangement by the piezoelectric transducer. Thus, in FIGS. 1 to 7, the transducer causes the slide valve to effect a translational displacement, while in FIGS. 8 to 12 the displacement of the slide valve is rotational. Irrespective of whether the displacement of the slide valve be translational or rotational, it is to be noted that, in accordance with the invention, during at least initial displacement of the slide valve from its second, i.e. open, position towards its first, i.e. closed, position, the slide valve is always displaced in a direction transverse wt the first axis 18 about which the dispensing opening 16 extends.

Figure 2B:
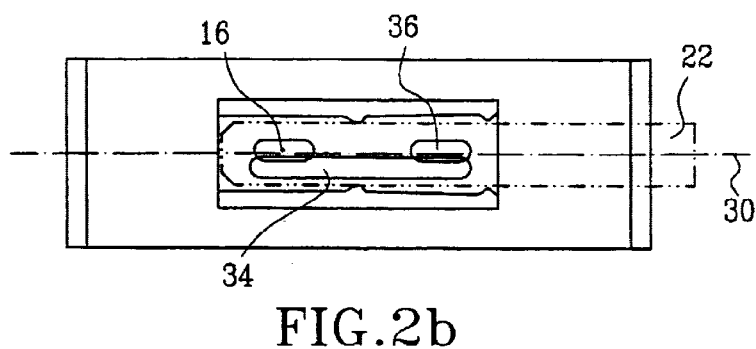
FIG. 2b is a partial plan view of the embodiment of FIG. 1, though on a larger scale, showing the valve arrangement in an open position.
Figure 3:
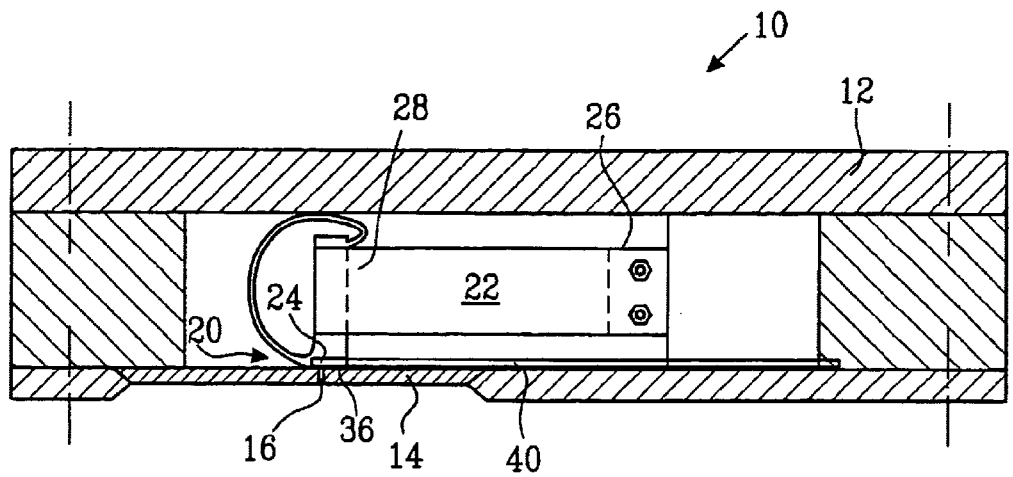
FIG. 3 is a view similar to FIG. 1, though of a second embodiment of fluid dispensing apparatus according to the present invention.

Considering now the various embodiments in turn, in the embodiments illustrated in FIGS. 1 to 3 the piezoelectric transducer 22 is rigidly held at its first end 26 to the housing 12 and the valve arrangement 20 is located in the vicinity of its second end 28. The valve arrangement 20 comprises the slide valve 24 and may be affixed to the second end of the transducer in any suitable manner. For example, in FIG. 1 the valve arrangement is in the form of a unit attached to the second end of the transducer. The unit comprises the slide valve in the form of a valve plate which is urged towards the base plate 14 by resilient means 32. As can be seen from FIGS. 2a and 2b, the valve plate is provided with a recess 34 in its surface facing the base plate. The recess 34 extends substantially parallel to the second axis 30 of the transducer 22. The base plate 14 has a fluid supply passage 36 adjacent the dispensing passage 16. The fluid supply passage 36 communicates with a common feed conduit 38 running along the exterior of the housing 12 along which fluid from a not shown reservoir can be fed under pressure. As is most clearly apparent from FIGS. 2a and 2b, the passages 16 and 36 are each provided with an elongate opening in the surface of the base plate 14 over which the slide valve 24 moves. The openings are elongate in a direction substantially parallel to the second axis 30 and thereby substantially parallel to he recess 34. The conduit 38 may be formed in a plate 39 of suitable material such as glass, ceramic, metal, plastics or the like. In a preferred embodiment, the plate 39 is glass and is bonded to the base plate 14. In the first position of the valve arrangement, and as illustrated in FIG. 2a, the dispensing passage 16 is isolated from the fluid supply passage 36 by the valve plate. In the second position of the valve arrangement, as illustrated in FIG. 2b, i.e. when there is a change in the electrical potential across the piezoelectric transducer 22, the second end 28 of the transducer is displaced in a direction transverse to its second axis 30, thereby causing the valve plate to move in the same direction. From FIG. 2b, it will be apparent that, in the second position, the recess 34 and the fluid supply passage 36 and dispensing passage 16 are arranged such that the recess connects the two passages together. Thus, fluid can flow from the fluid supply passage 36, along the recess 34, into the dispensing passage 16 to be ejected from the apparatus. When the electrical potential across the piezoelectric transducer reverts to its original value, the second end 28 of the transducer returns to the position shown in FIG. 2a, thereby displacing the slide valve in a direction transverse to the fist axis 18 to interrupt the flow of fluid from the fluid supply passage 36 to the dispensing passage 16.

The embodiment illustrated in FIG. 3 differs from that described above in the manner in which fluid is supplied to the valve plate. Thus, in FIG. 3, the fluid supply passage 36 is located in the valve plate rather than in the base plate 14. The fluid supply passage 36 is connected to the not shown source of fluid under pressure via a fluid supply conduit 40 extending substantially parallel to the second axis 30 of the piezoelectric transducer 22. The fluid supply passage 36 in the valve plate thus comprises an inlet portion generally parallel to the second axis 30 and an outlet portion generally parallel to the first axis 18 of the dispensing opening in the base plate 14. In the first position of the valve arrangement, the dispensing opening is closed by the valve plate. In the second position of the valve arrangement, i.e. when there is a change in the electrical potential across the piezoelectric transducer 22, the second end 28 of the transducer is displaced in a direction transverse to its second axis 30, thereby causing the valve plate to move in the same direction. Thus, in the second position, the outlet portion of the fluid supply passage 36 is brought to overlap the dispensing passage 16 in the base plate 14. Thus, fluid can flow from the fluid supply passage 36 into the dispensing passage to be ejected from the apparatus. When the electrical potential across the piezoelectric transducer reverts to its original value, the second end 28 of the transducer returns to its first position, thereby displacing the slide valve in a direction transverse to the first axis 18 to interrupt the flow of fluid from the fluid supply passage 36 to the dispensing passage 16.

Figure 4:
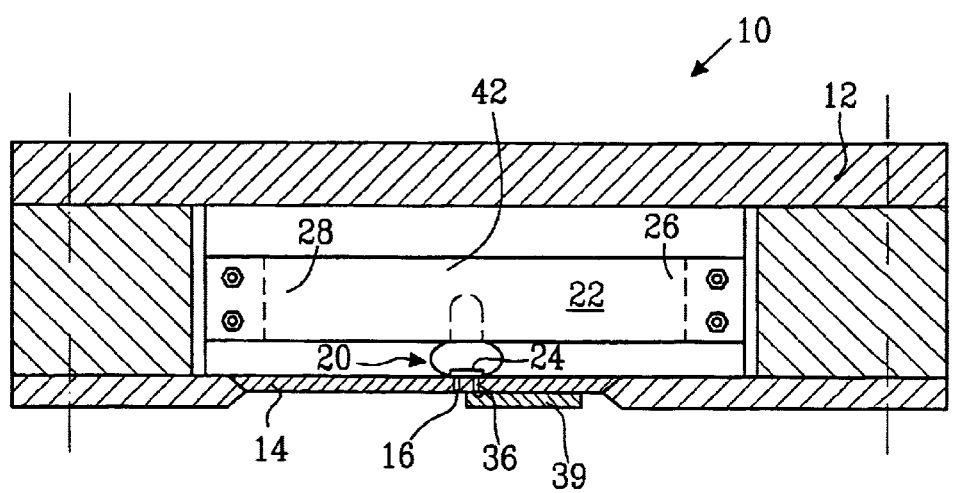
FIG. 4 is a view similar to FIG. 1, though of a third embodiment of fluid dispensing apparatus according to the present invention.

In the embodiment illustrated in FIG. 4, the piezoelectric transducer 22 is rigidly held at both its first end 26 and it second end 28. Thus, the portion of the transducer which effects displacement of the slide valve 24 is a mid portion 42 of the transducer. In the shown embodiment, the valve plate of the slide valve 24 and the means of supplying fluid correspond to those illustrated in FIGS. 1 and 2. Nevertheless, it is to be understood that the mid portion 42 of the transducer may be provided with the valve arrangement and fluid supply means of FIG. 3. When there is a change in the electrical potential across the piezoelectric transducer 22, the mid portion 42 of the transducer is displaced in a direction transverse to its second axis 30, thereby causing the valve plate to move in the same direction to connect the fluid supply passage 36 to the dispensing passage 16. When the electrical potential across the piezoelectric transducer reverts to its original value, the mid portion 42 of the transducer returns to its first position, thereby displacing the slide valve in a direction transverse to the first axis 18 to interrupt the flow of fluid from the fluid supply passage 36 to the dispensing passage 16.

Figure 5:
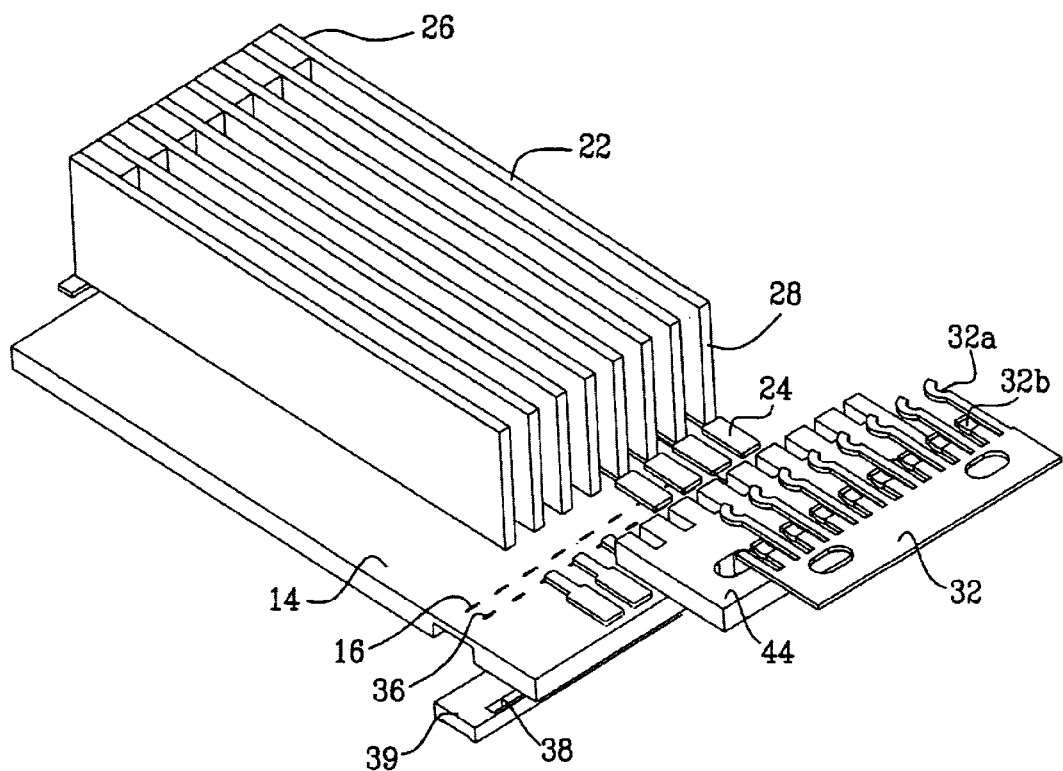
FIG. 5 is an exploded perspective view of a fourth embodiment of fluid dispensing apparatus according to the present invention.

In the embodiments illustrated in FIGS. 5 to 7, the displacement of the slide valve 24 is effected by a displacement of at least the second end portion 28 of the piezoelectric transducer 22 in a direction along the second axis 30. Thus, each piezoelectric transducer 22 is rigidly held at its first end 26. A slide valve 24 in the form of a valve plate is attached, for example by bonding, to the second end 28 of the transducer. Alternatively, the piezoelectric transducer itself may serve as the slide valve. To ensure that the axial displacement of the valve plate is in the correct direction, a guide block 44 is provided on the base plate 14. Resilient means 32, for example in the form of a spring plate, cooperates with the guide block 44 and each valve plate to ensure that the valve plates remain in sealing relationship with the base plate 14. Thus, the spring plate 32 comprises a first resilient portion 32a which co-operates with the guide block 44 and a second resilient portion 32b which acts on the valve plates 24.

Figure 6A:
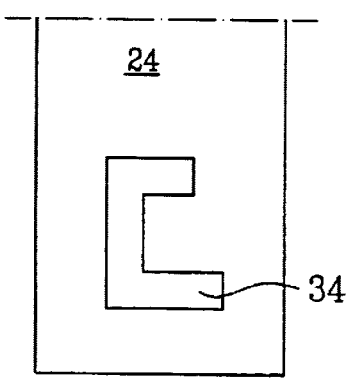
Figure 6B:
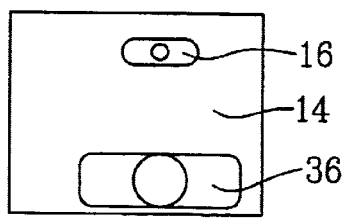

One possible arrangement of the slide valve 24 and the base plate 14 is illustrated in FIGS. 6a to 6d. As mentioned above, the slide valve may be comprised of a valve plate or a surface of the piezoelectric transducer itself. As in the embodiment illustrated in FIGS. 1, 2 and 4, the slide valve is provided with a recess 34 in its surface facing the base plate 14 As is most clear from FIG. 6b, the base plate accommodates a fluid supply passage 36 and a dispensing opening 16. In the first position of the valve arrangement, and as illustrated in FIG. 6c, the dispensing passage 16 is isolated from the fluid supply passage 36 by the valve plate of the slide valve. In the second position of the valve arrangement, as illustrated in FIG. 6d, i.e. when there is a change in the electrical potential across the piezoelectric transducer 22, the second end 28 of the transducer is displaced axially, i.e. in a direction along its second axis 30, thereby causing the valve plate to move in the same direction. From FIG. 6d, it will be apparent that, in the second position, the recess 34 and the fluid supply passage 36 and dispensing passage 16 are arranged such that the recess connects the two passages together. Thus, fluid can flow from the fluid supply passage 36, along the recess 34, into the dispensing passage 16 to be ejected from the apparatus.

When the electrical potential across the piezoelectric transducer reverts to its original value, the second end 28 of the transducer returns to the first position shown in FIG. 6c, thereby displacing the slide valve in a direction transverse to the first axis 18 to interrupt the flow of fluid from the fluid supply passage 36 to the dispensing passage 16.

Although the embodiment described above is supplied with fluid via a fluid supply passage 36 in the base plate 14, it is to be understood that fluid may instead be supplied via a fluid supply conduit 40 in the manner illustrated in FIG. 3. Of course, a prerequisite is that the conduit 40 be able to accommodate the change in axial dimension which the piezoelectric transducer 22 undergoes during its displacement from the first position to the second position.

A third manner of supplying fluid to the valve arrangement 20 is schematically illustrated in FIG. 7. In this embodiment, the valve plate 24 operates in the source of fluid under pressure. In other words, the housing 12 accommodates the fluid. The valve plate is provided with a fluid supply passage 36 extending through the valve plate from the surface of the valve plate remote from the base plate 14 towards a recess 35 in the base plate 14. There is also a recess 34 in the surface of the valve plate 24 abutting the base plate. Thus, fluid from within the housing can flow into the fluid supply passage 36. In the first position of the valve arrangement, the dispensing passage 16 is isolated from the recess 35 and the fluid supply passage 36 by the valve plate of the slide valve. In the second position of the valve arrangement, i.e. when there is a change in the electrical potential across the piezoelectric transducer 22, the second end 28 of the transducer is displaced axially, i.e. in a direction along its second axis 30, thereby causing the valve plate to move in the same direction. In the second position, the recesses 34 and 35 and the fluid supply passage 36 and dispensing passage 16 are arranged such that the recesses connect the two passages together. Thus, fluid can flow from the fluid supply passage 36, along the recess 35, into the recess 34 and finally into the dispensing passage 16 to be ejected from the apparatus. When the electrical potential across the piezoelectric transducer reverts to its original value, the second end 28 of the transducer returns to the first position, thereby displacing the slide valve in a direction transverse to the fist axis 18 to interrupt the flow of fluid from the fluid supply passage 36 to the dispensing passage 16.

In the remaining illustrated embodiments, the displacement of the slide valve 24 is rotational about a third axis 45. In a first embodiment illustrated in FIGS. 8 and 9, rotation of the slide valve is obtained by displacement of the piezoelectric transducer 22 in a direction transverse to the second axis 30. In a second embodiment illustrated in FIGS. 10 to 12, rotation of the slide valve is obtained by displacement of the piezoelectric transducer 22 in a direction along the second axis 30.

Thus, and with reference to FIGS. 8 to 12, the fluid dispensing apparatus 10 comprises a housing 12 having a base plate 14. The base plate 14 is provided with at least one dispensing passage 16 extending about a first axis 18 Associated with each dispensing passage 16, i.e. substantially immediately adjacent the passage in the interior of the, housing 12, there is arranged a valve arrangement, generally denoted by reference numeral 20. In each embodiment, a piezoelectric transducer 22 acts on the valve arrangement 20 to effect displacement of the valve arrangement between a first position in which the dispensing passage 16 is closed and a second position in which the dispensing passage is connected to a source of fluid under pressure.

Figure 9A:
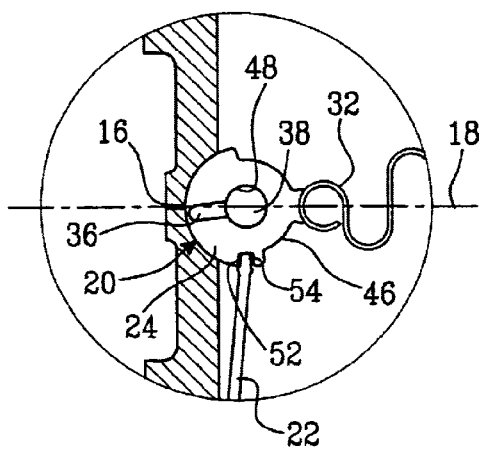
FIG. 9a is a partial plan view of the embodiment of FIG. 8, though on a larger scale, showing the valve arrangement in a closed position.
Figure 9B:
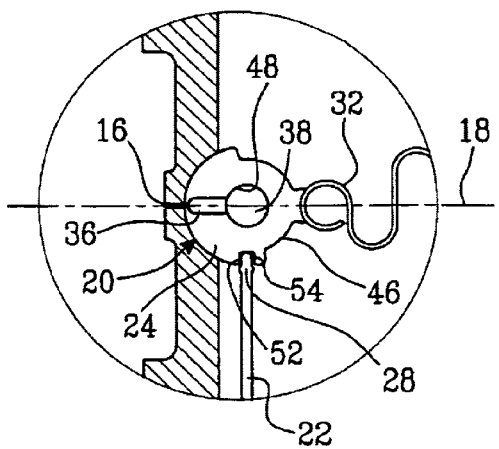
FIG. 9b is a partial plan view of the embodiment of FIG. 8, though on a larger scale, showing the valve arrangement in an open position.
Figures 11A, 11B:
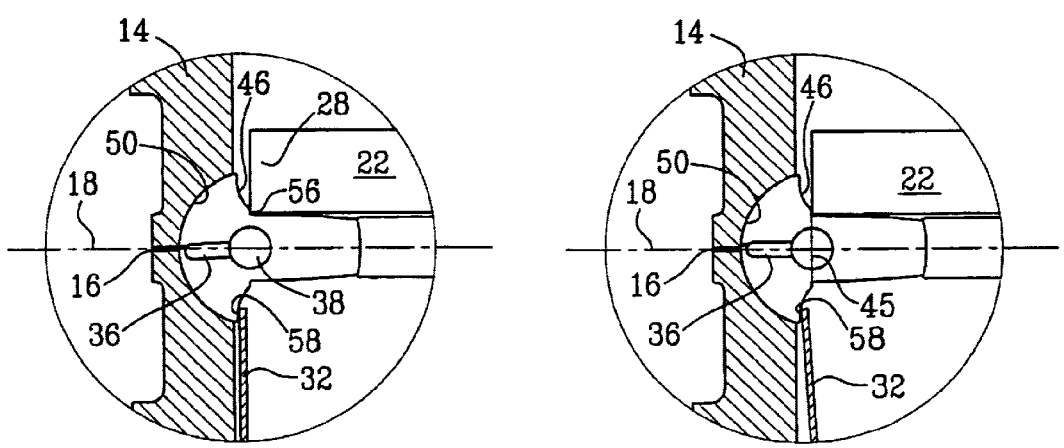
FIG. 11a is a partial plan view of the embodiment of FIG. 10, though on a larger scale, showing the valve arrangement in a closed position.
FIG. 11b is a partial plan view of the embodiment of FIG. 10, though on a larger scale, showing the valve arrangement in an open position.

The valve arrangement 20 comprises a valve plate 24 in the form of a rotatable cylindrical disc having a circumferential surface 46 and an inner surface 48. The inner surface 48 delimits a common feed commit 38 connected to a source of fluid under pressure. The disc further has a fluid supply passage 36 extending from the inner surface 48 to the circumferential surface 46. Thus, and as illustrated in FIGS. 9b and 11b, the common feed conduit 38 is substantially coaxial with the third axis 4. The third axis and the first axis 18 substantially perpendicular to each other.

Advantageously, a plurality of cylindrical discs are provided in the apparatus 10. The discs may thus be stacked one on the other, or alternatively separated by spacers. In the latter case, the spacers are cylindrical such that the through openings in the spacers and the discs form the common feed conduit 38. The disc or discs are supported in an arcuate recess 50 in the base plate and urged against the recess by resilient means 32.

Figure 8:
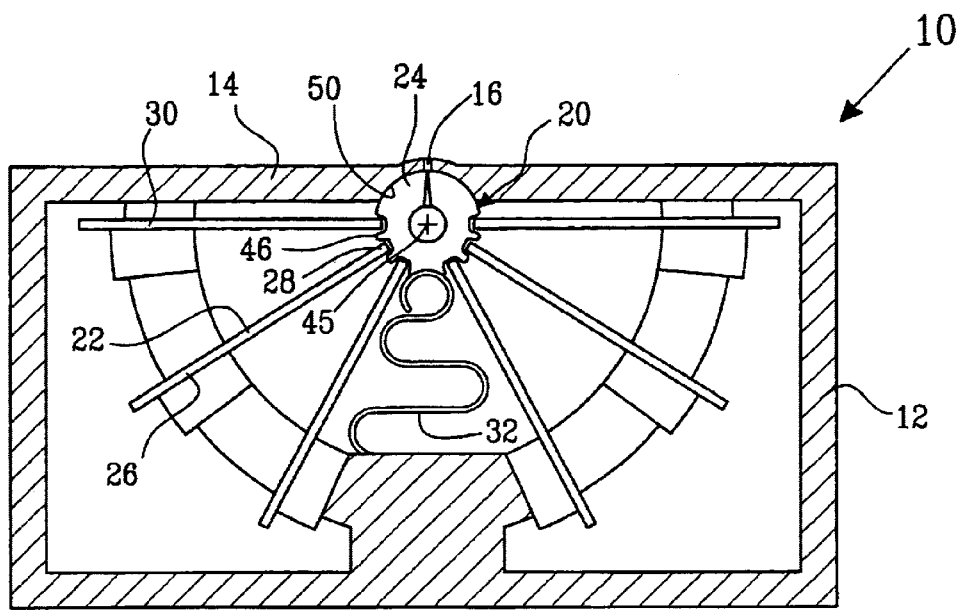
FIG. 8 is a schematic plan view of a further embodiment of the invention.

The circumferential surface 46 of each disc is provided with an abutment surface 52 for cooperation with a corresponding piezoelectric transducer 22. In the embodiment illustrated in FIGS. 8 and 9, rotation of each disc is obtained by displacement of the second end 28 of the respective transducer 22 in a direction transverse to the second axis 30. Thus, the second end 28 is accommodated in a recess 54 in the disc while the first end 26 is rigidly attached to the housing. The recess 54 in the disc incorporates the abutment surface 52. If there is a plurality of discs, it is advantageous if the transducers are arranged in a staggered fan-like arrangement within the housing 12 as shown in FIG. 8. In the first position of the disc 24 illustrated in FIG. 9a, the dispensing passage 16 in the base plate 14 is closed by a region of the circumferential surface 46 of the disc. In the second position of the valve arrangement, i.e. when there is a change in the electrical potential across the piezoelectric transducer 22, the second end 28 of the transducer is displaced in a direction transverse to its second axis 30, thereby causing the disc to move clockwise as shown in the drawings. Thus, in the second position, the fluid supply passage 36 is brought to overlap the dispensing passage 16 in the base plate 14. Accordingly, fluid can flow from the fluid supply passage 36 into the dispensing passage 16 to be ejected from the apparatus. When the electrical potential across the piezoelectric transducer reverts to its original value, the second end 28 of the transduce returns to its first position, causing the disc to move anticlockwise, thereby interrupting the flow of fluid from the fluid supply passage 36 to the dispensing passage 16. It is of course to be understood that the directions of rotation can be opposite to those shown. Furthermore, should a plurality of discs be used, alternate discs may be caused to rotate from the first to the second position in opposite directions.

Figure 10:
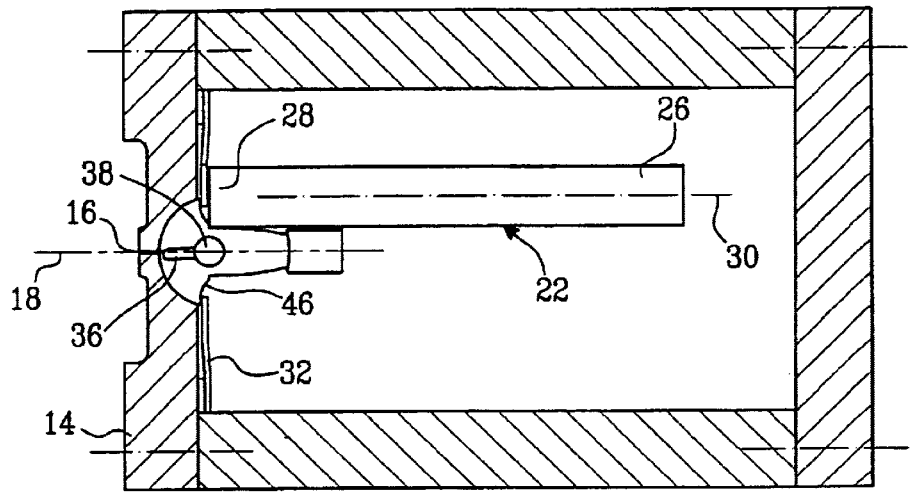
FIG. 10 is a schematic plan view of another embodiment of the invention.
Figure 12:
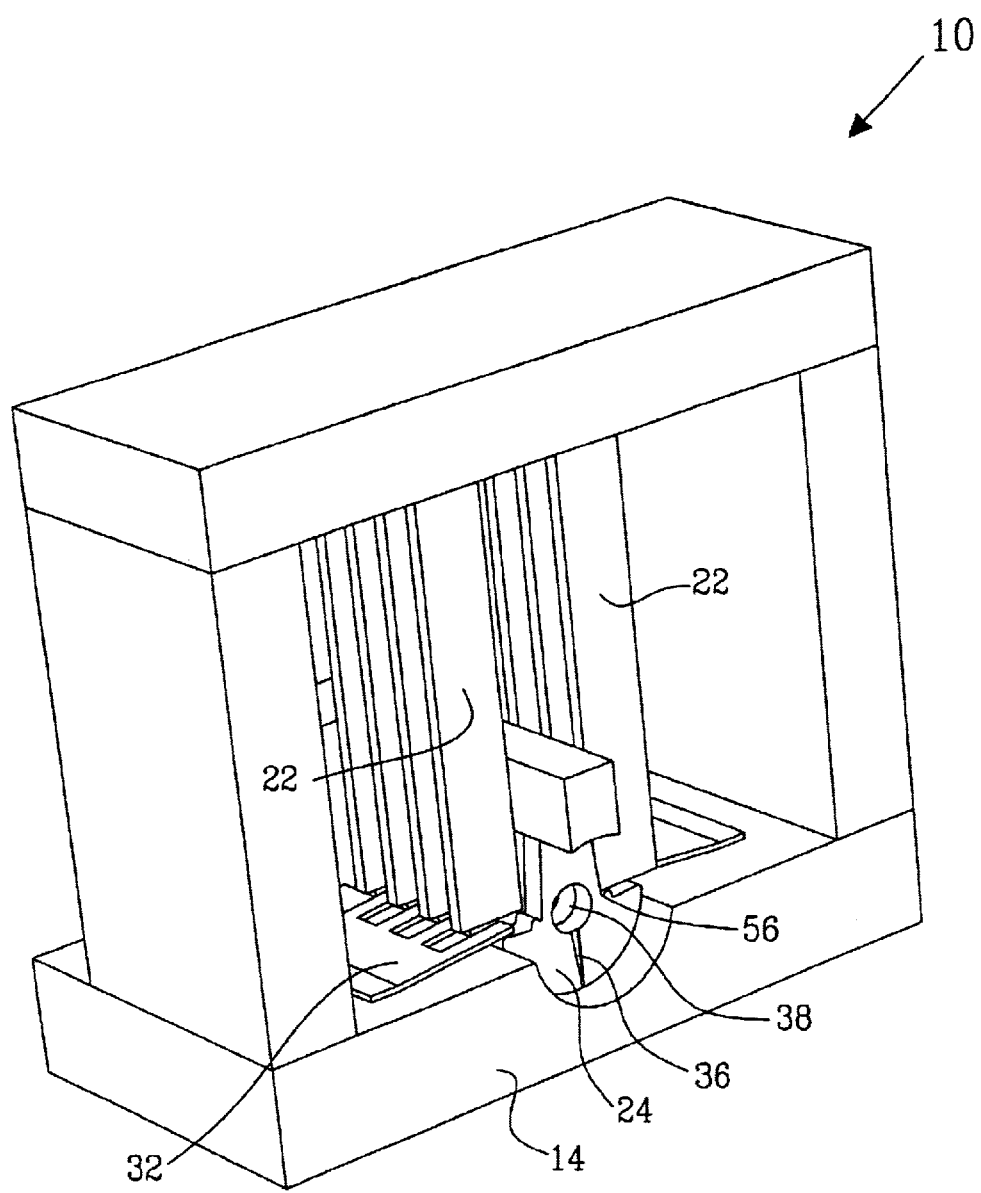
FIG. 12 is a schematic perspective view of the embodiment of FIG. 10.

In the embodiment illustrated in FIGS. 10 to 12, rotation of each disc is obtained by displacement of the second end 28 of the respective transducer 22 in a direction along the second axis 30. Preferably, the transducers are arranged with respect to the valve arrangement 20 such that the second axis 30 of each piezoelectric transducer 22 is substantially parallel to the first axis 18 of the dispensing passage 16 in the base plate 14. The second end 28 of each transducer abuts against an abutment surface in the form of a first shoulder 56 of the circumferential surface 46 of a respective disc, with the first end 26 being rigidly attached to the housing. The resilient means 32 in this embodiment is preferably in the form of a leaf spring acting on a second shoulder 58 on the circumferential surface 46 of the disc. The resilient means serves thus to both aid in retaining the disc in the arcuate recess 50 in the base plate, as well as acting as a return spring for the rotation of the disc from its second position back to its first position. In the first position of the disc 24 illustrated in FIG. 11a, the dispensing passage 16 in the base plate 14 is closed by a region of the circumferential surface 46 of the disc. In the second position of the valve arrangement, i.e. when there is a change in the electrical potential across the piezoelectric transducer 22, the second end 28 of the transducer is displaced axially in a direction along its second axis 30 to act on the first shoulder 56 of the dice to thereby cause the disc to rotate anticlockwise as shown in the drawings. Thus, in the second position, the fluid supply passage 36 is brought to overlap the dispensing passage 16 in the base plate 14. Accordingly, fluid can flow from the fluid supply passage 36 into the dispensing passage 16 to be ejected from the apparatus. When the electrical potential across the piezoelectric transducer reverts to its original value, the second end 28 of the transducer returns to its first position, allowing the disc to move clockwise under the influence of the resilient means 32, thereby interrupting the flow of fluid from the fluid supply passage 36 to the dispensing passage 16.

In the embodiment illustrated in FIGS. 10 to 12, a plurality of discs may be arranged such that the transducers 22 and resilient means 32 act on alternating sides of the discs along the axial extension of the array of discs.

With respect to the embodiments illustrated in FIGS. 1, 2 and 4 to 7, it is to be understood that the expression "during at least initial displacement" in the phrase "said slide valve and said piezoelectric transducer 22 being arranged such that during at least initial displacement of the valve arrangement from said second position towards said first position, said slide valve 24 is displaced in a direction transverse to said first axis 18" means at least the initial displacement of the recess 34 in the valve plate substantially parallel to the base plate 14. With respect to the embodiment illustrated in FIG. 3, the above expression means at least the initial displacement of the outlet portion of the fluid supply passage 36 in the valve plate with respect to the dispensing opening 16. In terms of the embodiments illustrated in FIGS. 9 to 12, the above expression means at least the initial displacement of the outlet end of the fluid supply passage 36 with respect to the dispensing opening 16, even though the displacement of the cylindrical disc is actually angular.

The above-described embodiments are eminently suitable for dispensing ink in drop-on-demand ink jest printers, and particularly in combination with on-demand ink supply.

In a not-shown embodiment, opening and closing of the dispensing opening 16 is effected by vertical displacement of a valve body attached to the second end of a vertically disposed rod of piezoelectric material.

The invention is not restricted to the embodiments described above and shown in the drawings, but may be varied within the scope of the appended claims. For example, a nozzle plate may be attached to the exterior surface of the base plate 14, which nozzle plate includes nozzles forming axial extensions of the dispensing passages 16 in the base plate 14. Furthermore, it is conceivable that the plate 39 in which the common feed conduit 38 is formed be provided with axial extensions of the dispensing passages 16. Such plate 39 may also be provided with a nozzle plate on its external surface.

What is claimed is:

1. A fluid dispensing apparatus for selectively dispensing desired quantities of a fluid under pressure, said apparatus comprising:

a base plate having a dispensing passage extending about a first axis;

a valve arrangement associated with said dispensing passage, and a piezoelectric transducer acting on said valve arrangement to effect displacement of said valve arrangement between a first position in which said dispensing passage is closed and a second position in which said dispensing passage is connected to a source of said fluid under pressure, wherein said valve arrangement comprises a slide valve, said slide valve and said piezoelectric transducer being arranged such that during at least initial displacement of the valve arrangement from said second position towards said first position, said slide valve is displaced in a direction transverse to said first axis.

2. The fluid dispensing apparatus as claimed in claim 1, wherein said piezoelectric transducer has a longitudinal extension from a first end to a second end along a second axis, and displacement of said slide valve is effected by a displacement of a portion of said piezoelectric transducer in a direction transverse to said second axis.

3. The fluid dispensing apparatus as claimed in claim 2, wherein said piezoelectric transducer is rigidly held at said first end and said portion of said piezoelectric transducer which effects displacement of said slide valve is at least said second end.

4. The fluid dispensing apparatus as claimed in claim 3, wherein said slide valve comprises a valve plate arranged for rotational displacement about a third axis.

5. The fluid dispensing apparatus as claimed in claim 4, wherein said valve plate is in the form of a cylindrical disc having a circumferential surface and an inner surface, said inner surface delimiting a common feed conduit connected to said source of said fluid under pressure, said disc further having a fluid supply passage extending from said inner surface to said circumferential surface, said circumferential surface being provided with an abutment surface for co-operation with said piezoelectric trandsducer, said fluid supply passage being arranged in said cylindrical disc such that when said valve arrangement is in said second position, said fluid supply passage connects said common feed conduit to said dispensing passage.

6. The fluid dispensing apparatus as claimed in claim 5, wherein said common feed conduit is substantially coaxial with said third axis, said third axis and said first axis being substantially perpendicular to each other.

7. The fluid dispensing apparatus as claimed in claim 6, wherein said first axis and said second axis are substantially parallel to each other.

8. The fluid dispensing apparatus as claimed in claim 5, wherein said cylindrical disc is supported in an arcuate recess in said base plate, said disc being urged against said arcuate recess by resilient means.

9. The fluid dispensing apparatus as claimed in claim 8, wherein said resilient means acts to urge said cylindrical disc from said second position of said valve arrangement towards said first position of said valve arrangement.

10. The fluid dispensing apparatus as claimed in claim 2, wherein said piezoelectric transducer is rigidly held at both said first end and said second end, and said portion of said piezoelectric transducer which effects displacement of said slide valve is a mid portion of said transducer between said first and second ends.

11. The fluid dispensing apparatus as claimed in claim 1, wherein said piezoelectric transducer has a longitudinal extension from a first end to a second end along a second axis, and displacement of said slide valve is effected by a displacement of a portion of said piezoelectric transducer in a direction along said second axis.

12. The fluid dispensing apparatus as claimed in claim 11, wherein said slide valve comprises a valve plate arranged for translational displacement.

13. The fluid dispensing apparatus as claimed in claim 12, wherein the base plate has a fluid supply passage adjacent said dispensing passage, and said valve plate, in a surface facing said base plate, exhibits a recess, said recess and said passages being arranged such that when said valve arrangement is in said second position, said recess connects said fluid supply passage to said dispensing passage.

14. The fluid dispensing apparatus as claimed in claim 12, wherein said valve plate comprises a fluid supply passage connected to said source of said fluid under pressure, said fluid supply passage being arranged in said valve plate such that when said valve arrangement is in said second position, said fluid supply passage and said dispensing passage communicate with each other.

15. The fluid dispensing apparatus as claimed in claim 14, wherein said valve plate operates in said source of said fluid under pressure, said valve plate exhibiting a first recess in a surface facing said base plate, and a second recess is provided in said base plate such that in said second position said fluid supply passage communicates via said second recess with said first recess in the valve plate to supply fluid to the dispensing opening.

16. The fluid dispensing apparatus as claimed in claim 14, wherein said fluid supply passage in said valve plate is connected to said source of said fluid under pressure via a fluid supply conduit extending substantially parallel to said second axis of said piezoelectric transducer.

* * * * *